Patented May 23, 1950

UNITED STATES PATENT OFFICE 2,508,801

2,508,801
PROCESSES FOR THE POLYMERIZATION OF VINYL COMPOUNDS

Marcel Louis Sans, Venissieux, France, assignor to Societe Anonyme des Manufactures des Glaces et Produits Chimiques de Saint-Gobain, Chauny & Cirey, Paris, France No Drawing. Application June 30, 1945, Serial No. 602,679. In France December 31, 1941

Section 1, Public Law 690, August 8, 1946
Patent expires December 31, 1961

12 Claims. (Cl. 260—92.8)

The present invention relates to improvements in processes for the polymerisation of vinyl compounds by heating under pressure in the presence of catalysts.

It is known to polymerise vinyl compounds by heating in the presence of peroxidised catalysts and, in particular, it has already been proposed to employ as such catalysts the organic peroxides or the persalts, such as the perborates, the percarbonates and the like.

However, the advanced polymerisation of vinyl compounds in the presence of these known catalysts, with the object of obtaining a product of high molecular weight on a commercial scale, meets with serious difficulties. These difficulties relate to the conduct of the polymerisation reaction and to the obtaining of a product of high quality.

Hitherto, in order to obtain high rates of polymerisation with operations of a commercially acceptable duration, that is to say, a good commercial yield, relatively large quantities of catalysts have been used. For example, in the case of the polymerisation of pure vinyl chloride, the quantities of catalysts proposed have a content in active oxygen, as compared with the weight of the monomer treated, of the order of 0.04 per cent and often higher. However, particularly when large quantities of material are worked with, it then becomes difficult to carry out the reaction without local overheating occurring and without the reaction either becoming violent or, on the contrary, being brought to a standstill or, again, without the materials being treated setting into a solid mass. In order to avoid these drawbacks, it has already been proposed, for example, to carry out the reaction by slowly increasing the temperature, or to terminate the reaction while there still remains a relatively important proportion of unpolymerized initial material, or, again, to operate in the presence of important quantities of solvents or diluents. These known processes lead either to complications in the conduct of the heating operation or to incomplete operations necessitating a redistillation of the monomer which has not entered into the reaction or to the necessity for a later separation of the solvents or diluents employed.

The object of the present invention, in contradistinction to these known processes, is to provide improved processes for the polymerisation of vinyl compounds, particularly vinyl chloride, whereby the proportion of catalyst employed may be reduced whilst ensuring a good commercial yield, even in the absence of solvents and diluents.

According to the invention the improved process is characterized by the use of a small quantity of a catalyst in the presence of substances capable of fixing the acid disengaged during the polymerization reaction, this small quantity of catalyst being such that, used alone, i. e. in the absence of the said acid-fixing substances, it would not produce an acceptable commercial yield. The fixation of the acid products of the reaction may be by neutralization, precipitation or by both neutralization and precipitation. More particularly stated, in relation to the case of the polymerisation of vinyl chloride in the absence of solvents or diluents, the quantity of catalyst employed must not contain more active oxygen than corresponds to 0.015% by weight of the monomer treated and this oxygen-content is preferably equal to about 0.005% by weight of the latter, these figures corresponding respectively to percentages of 0.24% and 0.08% of the weight of the monomer in the case where the catalyst is benzoyl peroxide.

The substances to be associated with these small quantities of catalyst in accordance with the invention may be, for example, alkaline salts, such as trisodium phosphate, or salts of carboxyl organic acids, such as the oxalate, formate and acetate of cadmium, zinc or lead.

It has already been proposed to add certain basic substances to the materials to be polymerised, in particular with a view to controlling the acidity of the reaction or of neutralizing that of the final product. No advantage was taken, however, of the presence of these substances to effect the polymerisation with the reduced proportion of catalyst such as has been defined above, in accordance with the invention, and which results in the following advantages being obtained.

1. The reaction may be easily carried out and the heating may be advanced from the outset to a relatively high temperature without risk of the reaction taking place violently.

2. There is directly obtained a polymerised product not containing any appreciable residual quantities of catalyst. It is not necessary, therefore, to treat the polymer obtained in order to remove therefrom the remaining catalyst which would tend to cause instability.

3. The use of the catalyst in small proportions results in a consequential reduction in the quantity of the decomposition products disengaged thereby, these products being capable of imparting various unwanted colourations to the finished product.

4. For the same reason, there is only required but a small quantity of the additional acid-fixing substances because the reaction takes place calmly and little acid is disengaged. There can thus be obtained a purer finished product which is more resistant to chemical agents and possesses excellent dielectric properties.

According to a preferred method of carrying out the process in accordance with the present invention, acetic anhydride or acetic acid is added in addition to the catalyst.

The nature of the invention will be fully understood from the following examples of ways in which it may be carried into effect.

Example 1

Into an autoclave fitted with an agitator there are introduced 250 kgs. of vinyl chloride monomer, 0.200 kg. of benzoyl peroxide (the active oxygen of this quantity of catalyst representing about 0.005% of the weight of the monomer) and 0.500 kg. of trisodium phosphate.

The temperature is raised immediately to about 55° C. with constant agitation of the reacting mass in order to render the temperature uniform throughout the same and to obtain a product in the form of powder. The polymerisation of the whole of the monomer is completed at the end of 48 hours.

Example 2

The procedure is as set forth in Example 1 except that 2 kgs. of lead acetate are also introduced into the mixture in the autoclave. Under these conditions, total polymerisation is achieved at the end of 35 hours.

The improvement afforded by the present invention may be measured by comparing with these two examples the case where, operating without utilising the invention, the same mass of vinyl chloride is treated with only the same small quantity of catalyst without the addition of trisodium phosphate or lead acetate. In this case, total polymerisation is only achieved after the reaction has lasted for more than 100 hours which, quite apart from the fact that the product obtained is of much inferior quality, means that this process is not a satisfactory commercial proposition.

Example 3

Under the same conditions as set forth in Example 1, there are reacted 250 kgs. of vinyl chloride monomer, 0.200 kg. of benzoyl peroxide, 2 kgs. of acetic anhydride and 0.500 kg. of trisodium phosphate. Complete polymerisation is obtained in less than 30 hours.

Example 4

The same bodies are reacted as in Example 3 and in the same proportions but with the addition of 2 kgs. of lead acetate. In these conditions, complete polymerisation of the vinyl chloride is obtained in less than 24 hours with heating at 55° C. The resultant product is in the form of a homogeneous powder which may be utilised directly without any subsequent treatment, such as solution or purification, and yields manufactured articles of superior quality.

The above examples illustrate the application of the invention to the polymerisation of vinyl chloride in the absence of solvents or diluents, in cases where it leads to particularly remarkable results considering the difficulty normally experienced in obtaining a satisfactory product when the whole of the monomer is to be polymerised in the absence of solvents or diluents and when this polymerisation is to be effected rapidly.

What is claimed is:

1. A process for the bulk polymerization of vinyl chloride that includes the steps of heating vinyl chloride to polymerizing temperature in liquid phase in the presence of a peroxide catalyst containing less than .015% active oxygen based on monomer weight and in the presence of a metallic salt capable of reacting with HCl, with agitation.

2. A process for the bulk polymerization of vinyl chloride that includes the steps of heating vinyl chloride to polymerizing temperature in liquid phase in the presence of a peroxide catalyst containing about .005% active oxygen based on monomer weight and in the presence of a metallic salt capable of reacting with HCl, with agitation.

3. A process for the bulk polymerization of vinyl chloride that includes the steps of heating vinyl chloride to polymerizing temperature in liquid phase in the presence of a peroxide catalyst containing less than .015% active oxygen based on monomer weight and in the presence of an alkaline salt capable of reacting with HCl, with agitation.

4. A process for the bulk polymerization of vinyl chloride that includes the steps of heating vinyl chloride to polymerizing temperature in liquid phase in the presence of a peroxide catalyst containing less than .015% active oxygen based on monomer weight and in the presence of a metallic salt of a carboxylic acid capable of reacting with HCl, with agitation.

5. A process for the bulk polymerization of vinyl chloride that includes the steps of heating vinyl chloride to polymerizing temperature in liquid phase in the presence of a peroxide catalyst containing less than .015% active oxygen based on monomer weight and in the presence of trisodium phosphate, with agitation.

6. A process for the bulk polymerization of vinyl chloride that includes the steps of heating vinyl chloride to polymerizing temperature in liquid phase in the presence of a peroxide catalyst containing less than .015% active oxygen based on monomer weight and in the presence of lead acetate, with agitation.

7. Polyvinyl chloride produced by the heating of vinyl chloride in liquid phase to polymerizing temperature in bulk in the presence of a peroxide catalyst containing less than .015% active oxygen based on monomer weight and in the presence of a metallic salt capable of reacting with HCl, with agitation.

8. Polyvinyl chloride produced by the process of claim 2.

9. Polyvinyl chloride produced by the process of claim 3.

10. Polyvinyl chloride produced by the process of claim 4.

11. Polyvinyl chloride produced by the process of claim 5.

12. Polyvinyl chloride produced by the process of claim 6.

MARCEL LOUIS SANS.

REFERENCES CITED

The following references are of record in the file of this patent:

UNITED STATES PATENTS

| Number | Name | Date |
|---|---|---|
| 1,920,403 | Klatte et al. | Aug. 1, 1933 |
| 1,929,453 | Semon | Oct. 10, 1933 |
| 1,983,949 | Semon | Dec. 11, 1934 |
| 1,988,529 | Werntz | Jan. 22, 1935 |
| 2,068,424 | Mark et al. | Jan. 19, 1937 |
| 2,077,542 | Wulff et al. | Apr. 20, 1937 |
| 2,108,857 | Hopff | Feb. 22, 1938 |
| 2,218,645 | Japs | Oct. 22, 1940 |
| 2,365,400 | Fikentscher | Dec. 19, 1944 |
| 2,365,506 | Alexander et al. | Dec. 19, 1944 |
| 2,387,571 | Fikentscher et al. | Oct. 23, 1945 |